United States Patent [19]

Parsons

[11] Patent Number: 4,804,205
[45] Date of Patent: Feb. 14, 1989

[54] VEHICLE SUSPENSION ASSEMBLY

[76] Inventor: Francis E. Parsons, 21 Britannia Street, Geelong West, Victoria, Australia

[21] Appl. No.: 84,796
[22] PCT Filed: Oct. 22, 1986
[86] PCT No.: PCT/AU86/00317
§ 371 Date: Jun. 22, 1987
§ 102(e) Date: Jun. 22, 1987
[87] PCT Pub. No.: WO87/02628
PCT Pub. Date: May 7, 1987

[30] Foreign Application Priority Data

Oct. 22, 1985 [AU] Australia .................. PH03027

[51] Int. Cl.$^4$ .............................................. B60G 11/02
[52] U.S. Cl. ...................................... 280/718; 280/686
[58] Field of Search ............... 280/104, 686, 718, 725, 280/685

[56] References Cited

U.S. PATENT DOCUMENTS

| | | | |
|---|---|---|---|
| 2,174,320 | 9/1939 | Gonard | 280/718 |
| 2,309,812 | 2/1943 | Utz | 280/718 |
| 2,361,323 | 10/1944 | Seghens | 280/686 |
| 2,369,501 | 2/1945 | Wagner et al. | 280/725 |
| 2,988,352 | 6/1961 | Masser | 280/718 |
| 3,317,062 | 5/1967 | Grey et al. | 280/686 |

Primary Examiner—David M. Mitchell
Assistant Examiner—Ross Weaver
Attorney, Agent, or Firm—Banner, Birch, McKie & Beckett

[57] ABSTRACT

A suspension system for a wheeled vehicle, particularly for off road use, the suspension system comprising a plurality of axle assemblies (26, 35, 44), each carrying wheels (27, 36, 48) at either end with a leaf spring suspension element (28, 37, 45) located between each end of each axle assembly and a chassis frame (20) of the vehicle, the axle assemblies (26, 35, 44) being connected to each leaf spring suspension element (27, 36, 48) by means of a connecting device (50) enabling pivotal movement of the spring suspension element relative to the associated axle assembly about an axis transverse to the axle assembly or generally parallel to the longitudinal direction of the vehicle thereby permitting relative vertical movement between the wheels at opposite ends of the axle assemblies without any substantial distortion or twisting of either the vehicle chassis or the spring elements themselves.

13 Claims, 8 Drawing Sheets

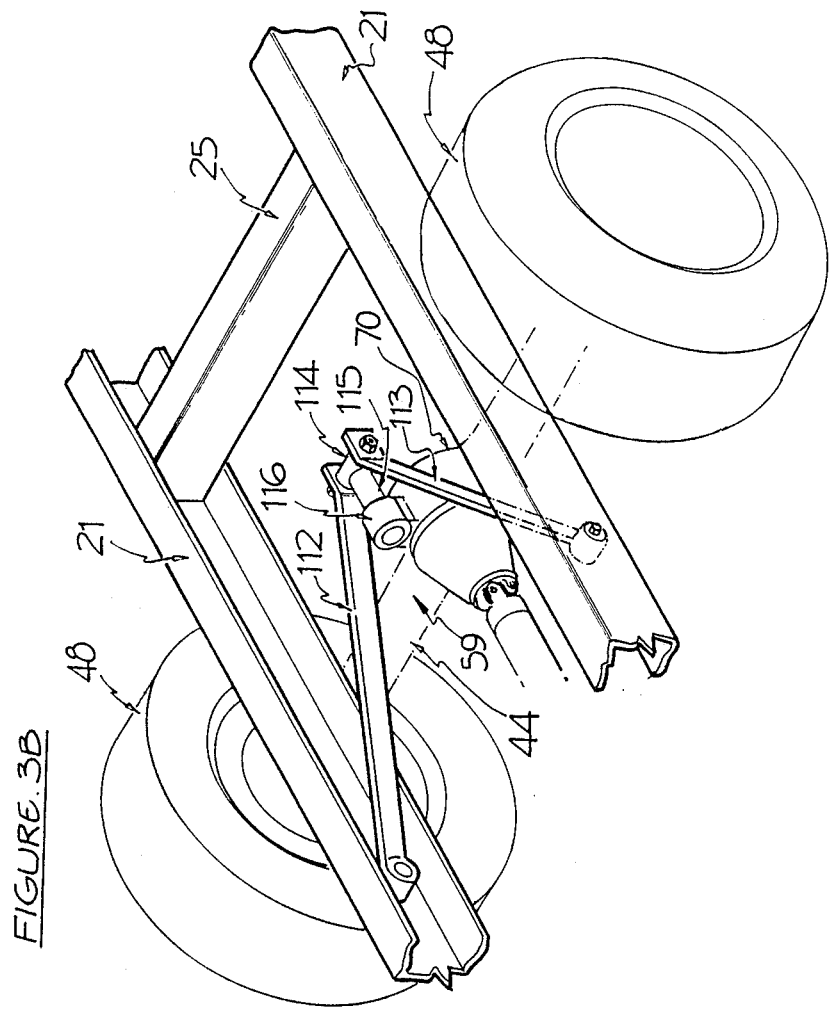

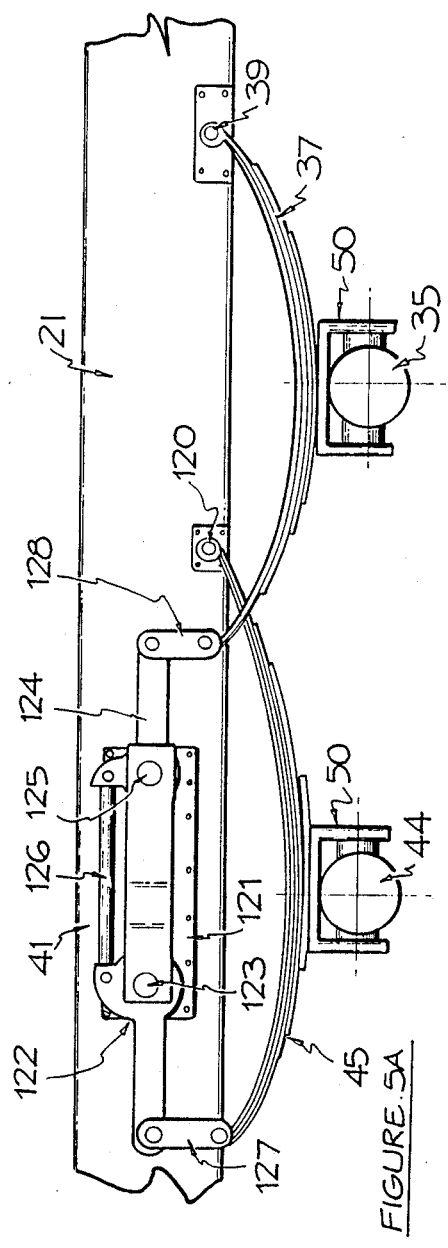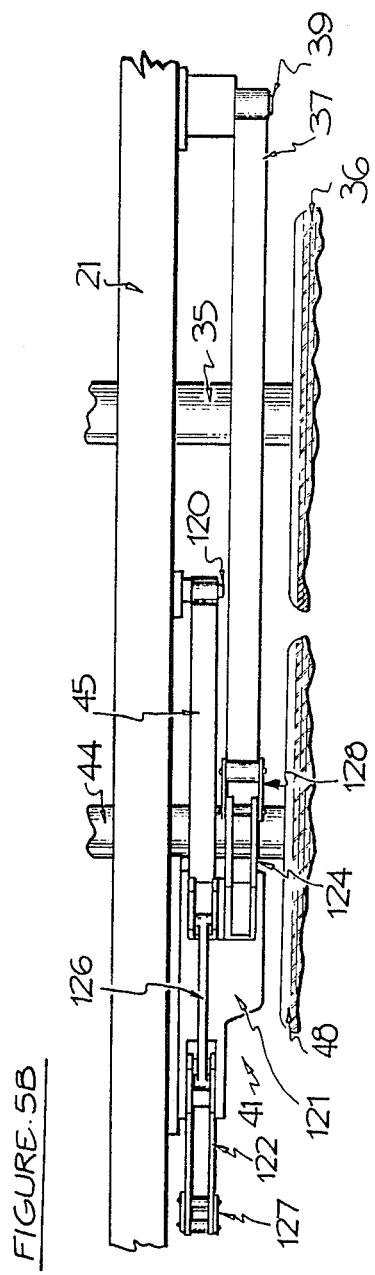
FIGURE 5A
FIGURE 5B

VEHICLE SUSPENSION ASSEMBLY

This invention relates to vehicles having at least one axle carrying a pair of steerable wheels and at least one axle carrying a pair of non-steerable wheels and more particularly relates to a vehicle having two parallel axles carrying non-steerable wheels.

The majority of multi axle vehicles have a pair of leaf springs as the suspension medium between the vehicle chassis and the respective axles. When the vehicle is operating on relatively smooth roads or level terrain there is only a limited degree of upward movement in a vertical direction between, the wheels at either end of the axle. However, this extent of movement becomes quite substantial when vehicles are operated in off-road conditions.

It is the normal practice for the axle to be rigidly attached, such as by a suitable clamping arrangement, to each of the left springs so as to substantially prevent movement between the axle and the spring. In some constructions hard rubber components may be interposed between the axle and the spring, but this rubber is of a very hard quality and is highly compressed by the conventional arrangement which clamps the axle to the spring. Accordingly the rubber only provides very limited movement between the axle and the spring as the wheels travel over uneven terrain.

Because of the substantial rigid nature of the connection between the axle and the springs, vertical movement of one wheel relative to the wheel at the other end of the axle may only take place by either distortion of the vehicle chassis or twisting of the leaves of the suspension spring. Suspension leaf springs as used on off road vehicles are highly resistant to twisting, and accordingly the rigid nature of the connection between the springs and the axle constitutes a restriction in the relative vertical movement between the wheels at either end of the axle.

It is therefore one of the objects of the present invention to provide a vehicle having an axle and suspension construction which will accommodate substantial relative vertical movement between the wheels at either end of the axle without twisting the springs or excessive distortion of the vehicle chassis.

With this object in view there is provided a vehicle suspension configuration comprising a chassis and at least one pair of wheels rotatably supported on an axle assembly disposed transversely to a longitudinal direction of the chassis, a pair of laterally spaced suspension leaf springs each connected at each end to the chassis and disposed generally parallel to the longitudinal direction of the chassis, and means connecting the axle assembly to each said suspension spring intermediate the ends of the spring and adapted to permit pivotal movement between the axle assembly and each said suspension spring about respective axes parallel to the longitudinal direction of the chassis.

Preferably one end of each suspension spring is pivotally connected to the chassis about an axis fixed in relation to the chassis while the other end is connected for limited displacement in the longitudinal direction as the spring deflects. The other end of the spring may be pivotally connected to an arm which is pivotally connected to the vehicle chassis. As is known, leaf springs vary in effective length between the ends when deflected by a load applied to it and this variation may be accommodated for by the above pivot connection arrangement. Alternatively the springs may be connected to the chassis for controlled movement of each end of the spring relative to the chassis in the longitudinal direction. In such an arrangement appropriately disposed control arms are provided to connect the axle to the vehicle chassis so the up and down movement thereof is on a controlled arcuate path.

Conveniently a channel-shaped member is provided to span across the axle in the longitudinal direction with pivot pins connected to the fore and aft portion of the channel-shaped member co-operating with bearings provided in rigid extensions of the axle. This provides a trunion type construction so that the channel-shaped member can angularly move with respect to the axle about an axis extending longitudinally of the vehicle. The suspension leaf spring is then rigidly clamped or otherwise fixed to the web portion of the channel member to provide the final connection between the axle and the suspension spring. Suitable bearing components are provided to take both rotational and thrust loads between the axle and the channel shaped member at both the forward and rear ends of the channel.

A pivotal form of connection between the suspension spring and the axle as above described eliminates the necessity for the suspension springs to be required to twist in order to accommodate relative vertical movement between the wheels at either end of the axle. This arrangement provides a soft suspension system and substantially reduces the stresses in the springs, the spring mountings and the vehicle chassis during such vertical movement. In a vehicle having multiple axles such as tandem rear axle vehicles, each of the axles may be connected to the respective suspension springs through pivot constructions which allows rotational movement between the spring and the axle about an axis extending longitudinally of the vehicle.

It is a further object of the present invention to provide in a tandem rear axle vehicle a suspension system which will provide greater stability to the vehicle when travelling over rough terrain and will also provide greater occupant comfort.

With this further object in view there is provided a vehicle having a chassis and at least one pair of wheels rotatably supported on a rigid axle disposed transversely to the longitudinal direction of the chassis, a pair of laterally spaced suspension springs operatively interposed between the axle and the chassis at transversely spaced locations, and a stabilising member interconnected between the axle and the chassis, and respective connector means connecting said stabiliser member to the axle and to the chassis at longitudinally spaced locations for pivotal movement relative to each about respective transverse axes parallel to the axle axis, at least one of said connector means being adapted to permit pivotal movement between the stabilizer member and the axle and/or chassis about an axis parallel to the longitudinal axis of the chassis, and at least one of said connector means being adapted to permit linear movement between the stabilizer member and the axle and/or chassis in the longitudinal direction of the chassis.

Conveniently, the stabilizer member is connected to only the axle or the chassis for limited relative linear movement and to only one of the axle or chassis for relative pivotal movement about the axis parallel to the longitudinal direction of the chassis. Preferably the stabilizer member is connected to one of the axle and chassis for both said linear movement and said pivotal movement about a longitudinal axis.

The stabilizer member may at the foreward end thereof be conveniently pivotally connected to the chassis at a location forward of the axle and preferably at two transversely spaced locations, for movement about the axis parallel to the axle. At the rear end, the stabilizer member is pivotally connected to a spigot member for pivotal movement about an axis parallel to the axle. The spigot member has a cylindrical spigot portion that is received in a bearing rigidly secured to the axle. The spigot axis is parallel to the longitudinal direction of the chassis and may rotate in the bearing about said axis. In addition, the spigot has a limited linear movement relative to the axle in the axial direction of the spigot and bearing. The stabilizer member may be of an A-frame configuration with the apex thereof connected to the spigot member and the ends of the legs connected to the chassis. The stabilizer member connected between the axle and the chassis as above discussed, prevents transverse movement of the axle relative to the chassis without restricting vertical movement and/or transverse rocking movement of the axle when traversing uneven terrain.

The existence of transverse movement of the axle as a result of vertical or rocking movement of the axle, gives rise to an undesirable steering affect on the vehicle which is not directly controllable by the driver.

The stabilizer member construction above discussed may be incorporated in a vehicle wherein the axle is pivotally connected to the suspension springs for relative movement about respective longitudinal axis as previously described.

With above stated further object in view there is also provided a vehicle suspension configuration having a chassis and a fore and aft rear axle assembly each disposed transversely to the longitudinal direction of the chassis, each axle assembly rotatably supporting a wheel at each end thereof, a pair of laterally spaced suspension leaf springs connecting each axle assembly to the chassis, each spring being disposed generally parallel to the longitudinal direction of the chassis, the springs connecting the fore axle assembly to the chassis being laterally spaced apart by a distance different to the lateral spacing of the spring connecting the aft axle assembly to the chassis.

Preferably the vehicle has a front axle carrying a pair of steerable wheels, the axle being connected to the chassis by a pair of laterally spaced leaf springs. The spacing between the leaf springs of the front axle being less than the spacing between the springs connecting the fore axle to the chassis and preferably being of approximately the same spacing as the springs connecting the aft axle to the chassis.

The wider spacing of the fore axle of the rear pair of axles provides greater lateral stability to the vehicle chassis, particularly when the vehicle is traversing rough terrain, and also permits the suspension springs of the fore and aft axle to overlap in the longitudinal direction of the vehicle and hence the springs may be longer and thus provide a softer ride. Normally in a tandem axle vehicle the suspension springs of the fore and aft axles are located in the same longitudinal plane parallel to the direction of the chassis and accordingly the lengths of the respective springs on either side of the vehicle are limited by the longitudinal spacing between the axles. However, when the forward axle springs are more widely spaced than the aft axle springs, the rear portion of the fore axle spring may overlap the forward end of the aft axle springs in the longitudinal direction and so the springs may be made longer without increasing the longitudinal spacing between the rear axles.

This construction is preferable to increasing the spacing between the axles to obtain the same effective spring lengths, since increased axle spacing results in increasing stresses in the chassis and the necessity for the suspension system to accommodate greater degrees of movement between the fore and aft axles in the vertical direction when travelling rough terrain.

Preferably the suspension springs connecting the fore and aft axles to the chassis incorporate a pivotal connection between the spring and the axle as previously discussed herein, and may also be connected to the chassis by respective stabilizer members of the previously discussed construction.

Further there is provided by the present invention a transmission for delivering power to two tandemly arranged axles of a vehicle, each axle having a wheel at either end and a differential unit drive coupled to the respective wheels, the transmission including a main input shaft adapted at one end for coupling to an input shaft of one axle differential unit, a power divider member mounted coaxially with the main input shaft for rotation relative thereto, a divider differential unit coupling the main input shaft to the power divider member to both rotate in the same direction and a drive train drive coupling the power divider member to an input shaft of the other axle differential unit.

Conveniently, the power divider member has an external peripheral surface with a toothed formation thereto driveably engage an endless flexible drive member. The input of the other differential unit has drive coupled thereto a member with a corresponding toothed formation on a peripheral surface thereof, whereby the endless flexible drive member may drive couple the power divider member to the toothed member on the other differential unit input shaft. Preferable means are provided to selectively direct couple the power divider member to the main input shaft to thereby prevent differential rotation therebetween and provide drive to each axle differential unit.

Preferably the flexible drive member is of a chain type of a suitable power and speed capacity to suit the vehicle to which the transmission is fitted. An example of a chain particularly suitable for this purpose is manufactured by the Marie Chain Company of U.S.A. and sold under the trade mark "HY-VO". This chain meshes with a gear tooth like formation of the periphery of a member rather than a sprocket tooth formation is commonly used with conventional drive chain.

The above described transmission can be constructed in a compact form and still be capable of transmitting high torques. Also the use of the chain drive avoids the use of an intermediate gear necessary in a gear drive to achieve uni-directional rotation of the input shafts to each axle differential unit.

Several preferred arrangements are hereinafter described with reference to the accompanying drawings, in which:

FIG. 3b is a partial perspective view similar to FIG. 3a illustrating a second preferred form of stabilizer arrangement;

FIG. 5a illustrates schematically in side elevation view a preferred form of suspension arrangement for a tandem axle configuration;

FIG. 5b illustrates in plan view the suspension arrangement shown in FIG. 5a.

Figure 1:
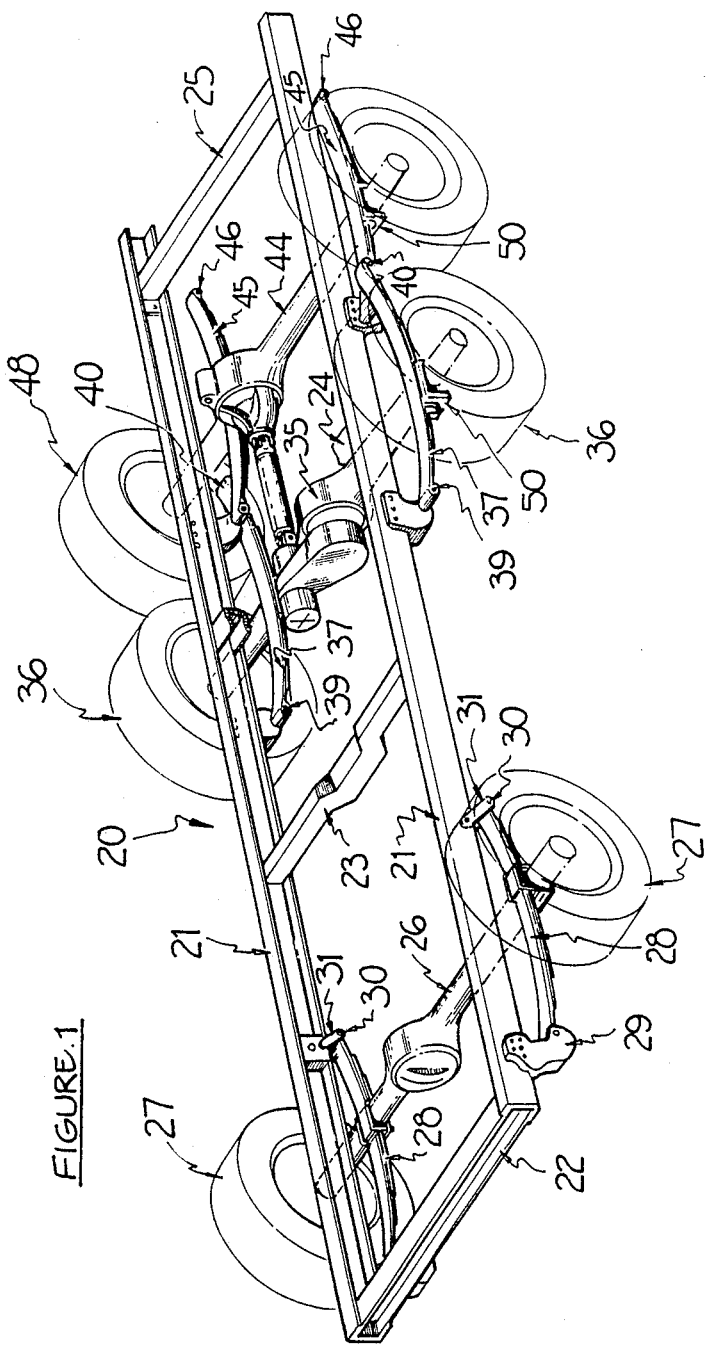
FIG. 1 is a perspective schematic layout of the suspension springs of a first embodiment having a forward steerable axle assembly and tandem rear drive axle assemblies.

Referring now to FIG. 1, the vehicle chassis is depicted at 20 with certain parts omitted for the sake of clarity. The chassis 20 comprises a pair of parallel longitudinal chassis frame members 21 and rigidly connected cross members 22,23,24 and 25. Cross member 22 identifies the forward end of the vehicle and cross member 25 identifies the rear end of the vehicle. The front axle assembly 26 is of a conventional front wheel drive steerable type in which the wheels 27 may be pivoted about a vertical axis for the purpose of steering the vehicle. The suspension leaf springs 28 are each connected at the forward end 29 for pivotal movement about fixed pins secured to the chassis. The rear ends 30 of the springs are pivotally connected through shackles 31 to the chassis.

Figure 6:
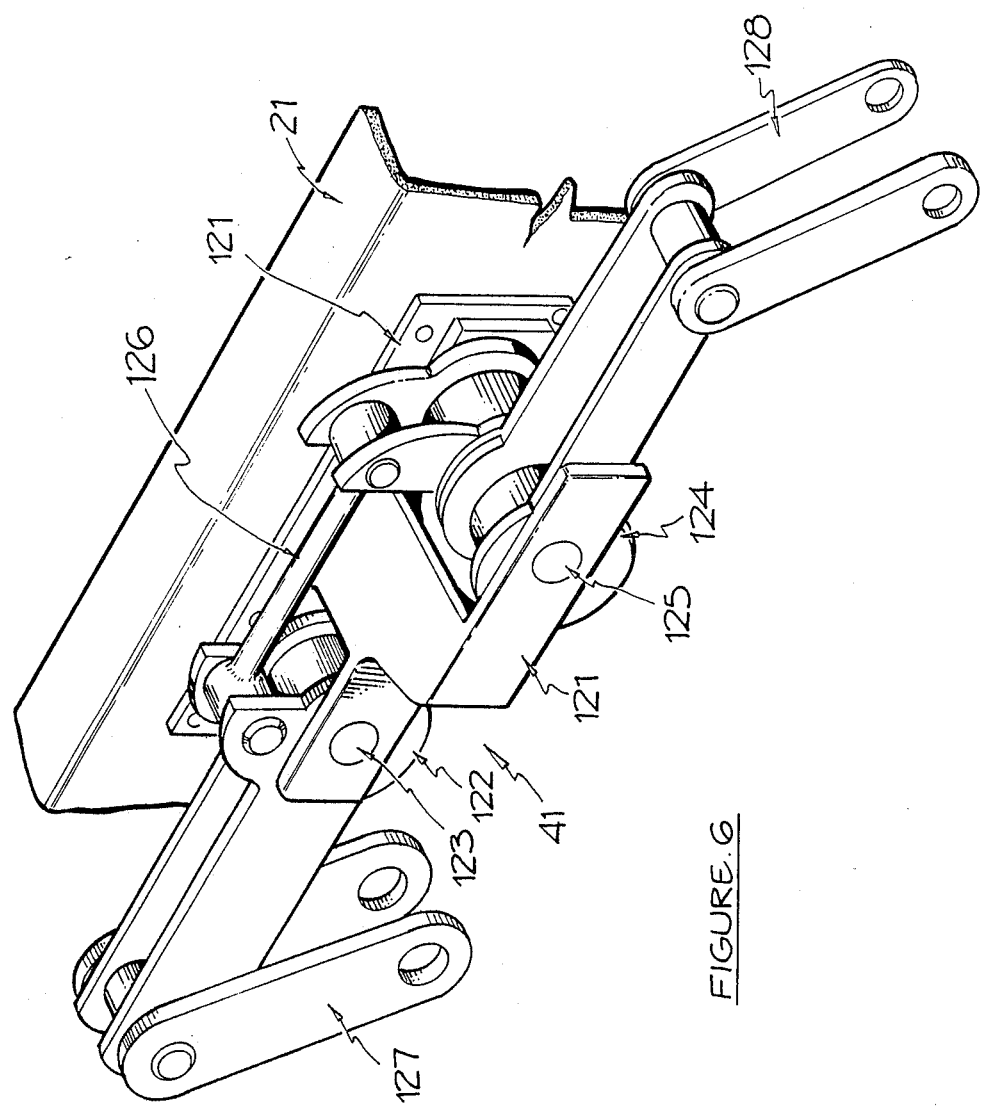
FIG. 6 is a detailed perspective view of the load transfer linkage assembly between the spring pair shown in the embodiment of FIGS. 5a and 5b.

The forward assembly 35 of the two rear axle assemblies, which for convenience may now be referred to as the mid-axle assembly, has driving wheels 36 at either end thereof and is connected to the chassis 20 by a pair of suspension leaf springs 37. It will be noted that the springs 37 are spaced wider apart than the springs 28 on the forward steering axle assembly. As best seen in FIGS. 5a,5b and 6 each of the suspension leaf springs 37 is pivotally connected to the chassis at the forward end 39 by fixed pivot pins and at the rear end is connected at 40 to the load transfer linkage 41 which is connected to the rear end 46 of the suspension leaf springs 45 of the aft driving axle assembly 44. The load transfer linkage enables the load to be distributed between the two axle assemblies when the vehicle is traversing rough terrain requiring substantial variation in the vertical disposition of the tandem axles.

The rear most axle 44 of the tandem axle pair also carries a pair of driven wheels 48 and is connected by the pair of leaf suspension springs 45 to the chassis 20 in the same manner as the suspension springs of the mid-axle assembly. The lateral spacing of the springs 45 connecting the rear tandem axle to the chassis is a smaller distance than the spacing of the springs 37 connecting the mid-axle assembly 35 to the chassis, and in the construction shown the spacing of the springs on the forward steerable axle assembly 26 is the same as that of the spacing of the springs on the rear tandem axle assembly 44. The difference in the spacing between the springs of the rear and forward axle of the tandem axle assembly is such that at least the rear end of the springs of the mid-axle assembly will pass outside the forward end of the springs of the rear tandem axle assembly so as to permit the springs to be of a greater effective length without a corresponding increase in the spacing between the mid and rear tandem axle assemblies.

Figure 1A:
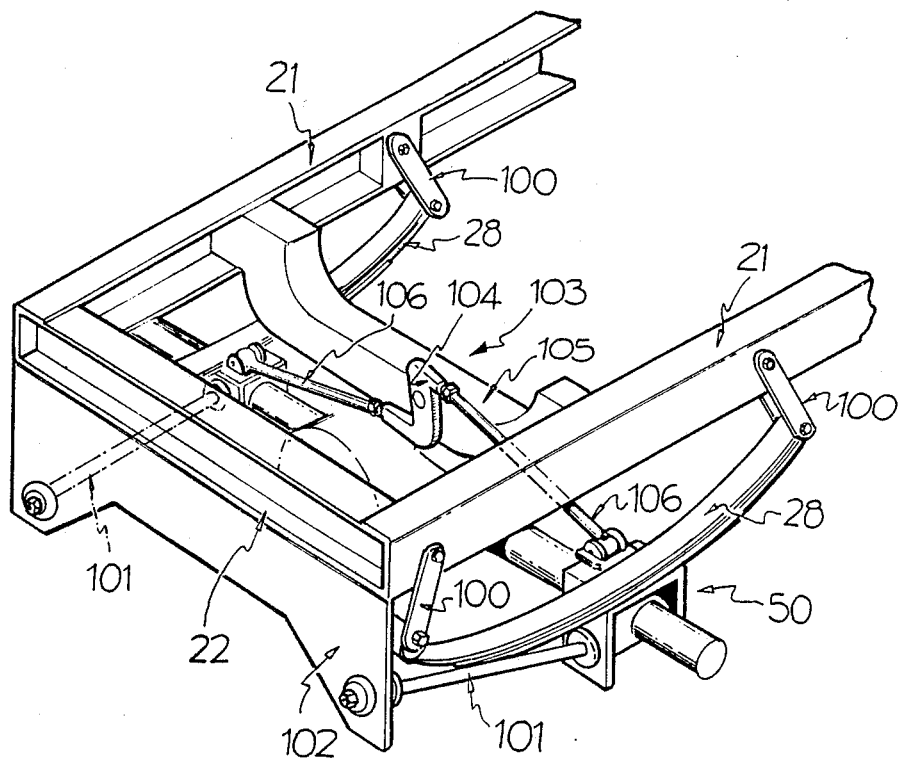
FIG. 1a is a partial view similar to FIG. 1 showing an alternative arrangement for the suspension of the forward axle assembly.

FIG. 1a illustrates an alternative embodiment for the suspension of the forward steerable axle assembly 26. In this arrangement the forward springs 28 are pivotally mounted at both ends to shackles 100 which are themselves pivotally mounted to the chassis side rails 21. An axle assembly mounting member 50 (as described in more detail hereinafter with reference to FIG. 2) is provided at either end of the axle assembly 26 enabling same to be centrally connected to the springs 28. Bump steer eliminator control rods 101 are mounted at a forward end to a downwardly depending bracket 102 rigidly connected to the forward chassis cross member 22. The control rods 101 are mounted at their rear ends to the axle assembly mounting members 50. The mounting of the control rods 101 at both ends is by an arrangement permitting swivelling movement whereby movement of the mounting members 50 is essentially controlled over a defined arc centered on the mounting of the rods 101 to the front chassis bracket 102. Moreover, a Watts linkage shown generally at 103 interconnects each of the axle assembly mounting members 50. The Watts linkage 103 comprises a central pivot member 104 connected to a fixed chassis member 105 with laterally extending rods 106 pivoted to the free ends of the central member 104. Each of the rods 106 is suitably pivotally connected to a respective axle assembly mounting means 50 (or the springs 28). The Watts linkage acts as a lateral movement stabilizer.

Figure 2:
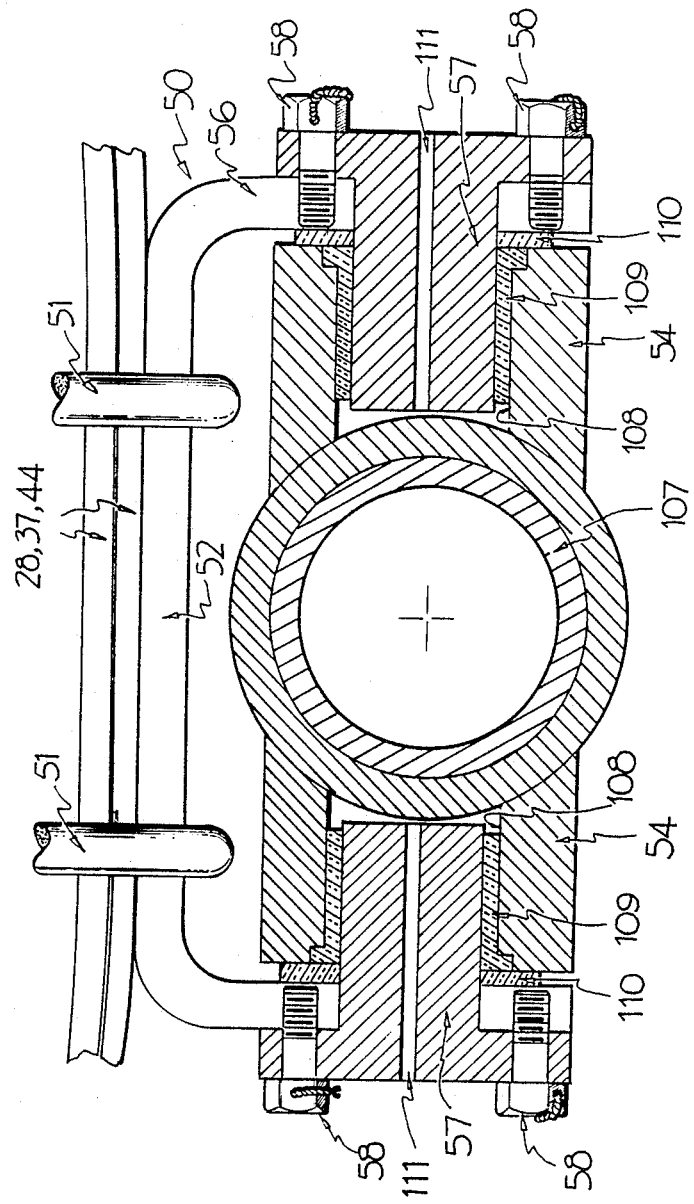
FIG. 2 is a detailed view of one preferred arrangement for mounting the axle assemblies to an associated leaf spring suspension.

FIG. 2 of the drawings depicts the manner of connection of the leaf springs of the tandem axle assembly (and the forward axle assembly in FIG. 1a) to the respective axle assemblies. The construction is arranged to permit pivotal movement between the respective springs 28, 37 or 45 and the associated axle assembly 26, 35 or 44 about a longitudinal axis parallel to the longitudinal direction of the vehicle chassis. The mounting member 50 is essentially channel shaped having a web portion 52 rigidly clamped or otherwise fastened to the leaf spring such as by bolts or U-clamps 51.

Aligned bosses 54 are rigidly secured to the casing 107 of the respective axle assembly and in use are disposed within the channel shaped mounting member 50, with the flanges 56 of the latter closely adjacent to the respective ends of the bosses. The bosses have aligned bores 108 to receive pivot shafts 57 secured by bolts 58 to each of the flanges 56 of the channel shaped mounted member 50. The pivot shafts 57 extend through the flanges 56 and into the bores 108 of the bosses 54 so as to provide a pivotal connection between the channel shaped mounting member 50 and the axle assembly. A suitable bearing 109 is disposed between the shafts 57 and the bores 58 and a thrust bearing 110 is disposed between the bosses 54 and the flanges 56. A lubricant passage 111 may be provided in each pivot shaft 57. In this manner both radial and axial loads may be transmitted between the axle bosses 54 and the pivot shafts 57.

Figure 3A:
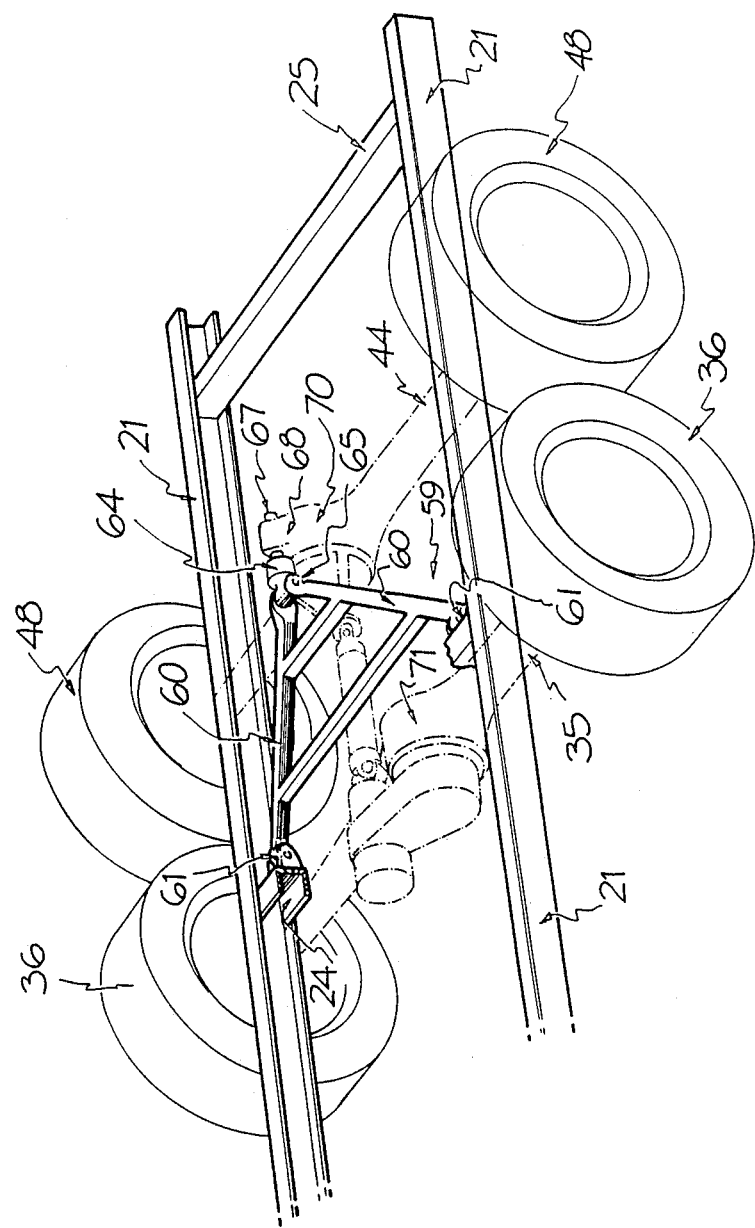
FIG. 3a is a partial perspective view illustrating a preferred form of stabilizer arrangement.

Reference is now made to FIG. 3a which depicts schematically a stabilizer frame connected between the tandem rear drive axle assemblies and the chassis of the vehicle as shown diagrammatically in FIG. 1. The following description will be in respect of a stabilizer frame applied to one of the rear drive axles, however, it is to be understood that the same frame in practice would be applied to each of the axles of the tandem axle unit.

The stabilizer frame 59 is generally of an A-shape with the ends of each of the legs 60 pivotally connected to brackets 61 provided on the chassis cross member 24 located forward of the rear drive axle assembly 44 of the tandem unit. The pivot connections between the A-frame legs and the brackets are aligned transversely of the chassis so that the A-frame may pivot relative to the chassis about a transverse axis which is generally parallel to the direction of the axles.

At the apex of the stabilizer frame 59, there is provided a spigot member 64 which is pivotally connected to the stabilizer frame at 65 for relative movement about an axis parallel to the pivot axis of the ends of the legs of the A-frame. The spigot member 64 has a cylindrical portion 67 which is slidable and rotatably received in the bearing block 68 rigidly secured to the axle assembly 44. The cylindrical portion 67 of the spigot member can rotate in the bearing block 68 about an axis parallel to the longitudinal direction of the vehicle chassis, and may also slide in a forward and aft direction with respect to the bearing block. This construction permits the axle assembly 44 to move up and down in a vertical plane and for the respective ends of the axle assembly to move relative to one another in a vertical direction, while at the same time the axle assembly is prevented from lateral transverse movement relative to the chassis and hence the wheels 48 carried by the axle assembly 44 remain in their correct tracking relationship with the other axles of the vehicle.

FIG. 3b illustrates an alternative arrangement for the stabilizer frame 59. Again in this embodiment the stabilizer frame is formed by an A-frame with legs 112 and 113 pivoted to the chassis side rails 21 so that the frame as a whole pivots about a transverse axis generally parallel to the rear axle assembly 44. The frame may also include stabilizing cross bars connecting the legs 112 and 113 but these are not essential. Each of the legs 112 and 113 extend beyond the axle assembly 44 and are pivotally interconnected by a spigot member 114. In this instance the spigot member includes a cylindrical rod slide member 115 extending forwardly and into a bearing member 116 rigidly secured to the differential housing 117 of the axle assembly 44. The frame 59 of this embodiment operates essentially in the same manner as the frame of FIG. 3a, however, it does have certain advantages. Firstly, because the arms 112 and 113 are longer than the arms 60 they form a shallower angle relative to the plane of the chassis frame 20 than do the arms 60. Thus a greater clearance is provided for the apparatus located beneath the frame. Perhaps more importantly, however, under heavy loads there is a tendency for the leaf springs to distort allowing the axle assemblies to rotate in a clockwise manner or for the bearing members 68, 116 to move rearwardly. This spring distortion can cause a permanent set in the spring configuration and will lead to eventual spring failure. The arrangement shown in FIG. 3b allows a limited sliding of the bearing member 116 relative to the slide rod 115 but the relative movement is limited and does not allow the distortion of the springs to go so far as to cause a permanent plastic deformation or failure.

The stabilizer frames shown in FIGS. 3a and 3b prevent any tendency for the mid and rear axle assemblies 35 and 44 to become misaligned with the front axle thereby preventing unwanted steering affects on the vehicle.

Figure 4:
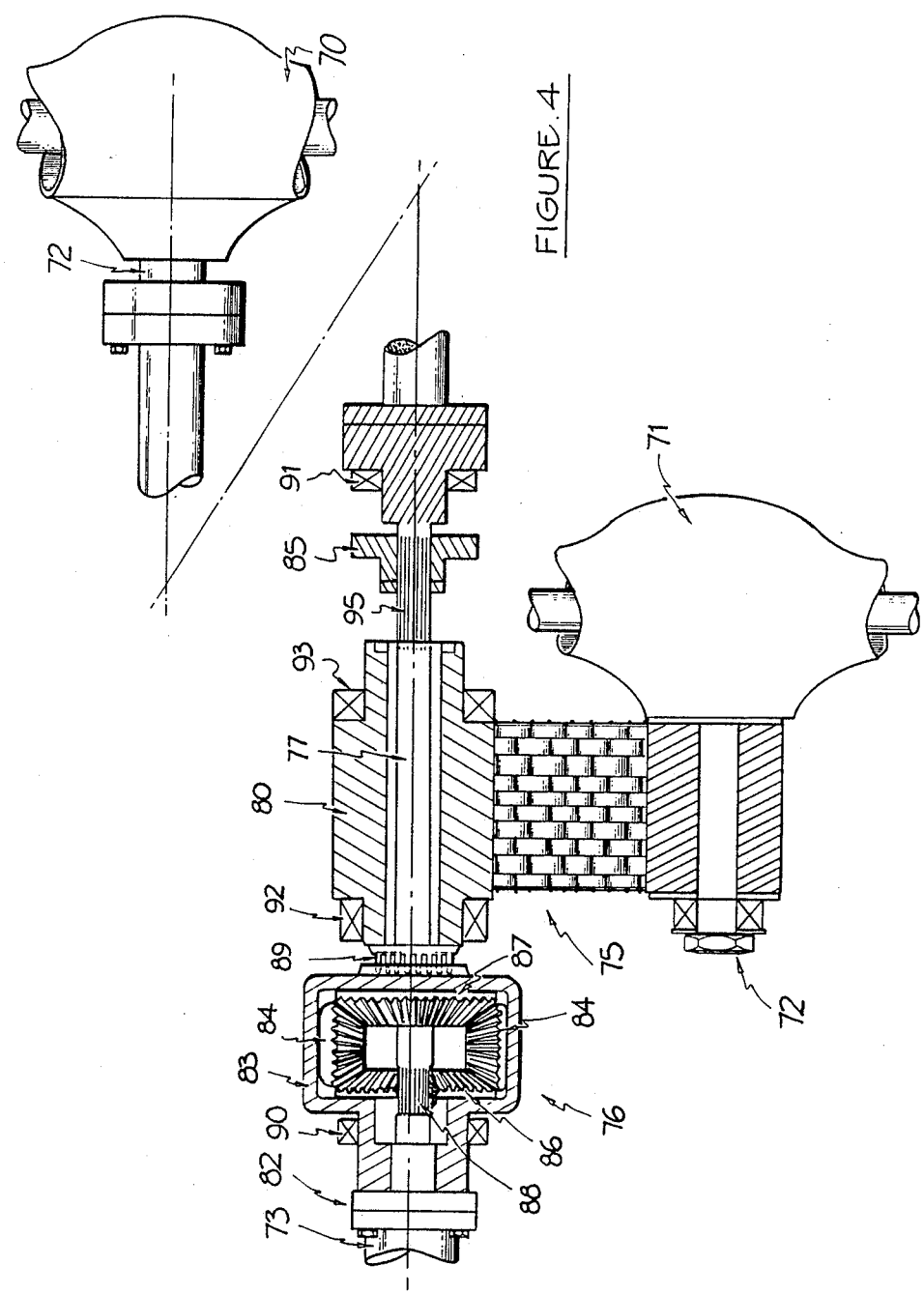
FIG. 4 illustrates schematically a preferred arrangement for dividing power between the drive axle assemblies of a tandem axle configuration.

FIG. 4 of the drawings illustrates an embodiment of the transmission for dividing the power between two drive axles of a tandem axle assembly as previously described in this specification. The differentials 70 and 71 for each of the axle assemblies are each provided with a conventional input pinion shaft 72 which forms part of a crown wheel and pinion drive. The drive power to the pinion shaft 72 of each of the axle assemblies is provided via the drive shaft 73 which is coupled via a suitable gear change mechanism (not shown) to a power plant such as an internal combustion engine (not shown). The power from the drive shaft 73 is divided by the power divider mechanism 76 between the two axles. The drive shaft 73 is coupled at 82 to the carrier member 83 of a differential unit 76 incorporating co-axial gears 86 and 87 and a planatory gear set 84, coupling the gears 86 and 87. The gear 86 is spline coupled at 88 to the shaft 77 and the gear 87 is spline coupled at 89 to the power divider member 80. The shaft 77 and power divider member 80 are arranged co-axially, the shaft 77 being supported by bearings 90 and 91 and the member 80 supported by bearings 92 and 93. The bearings 90, 91, 92 and 93 are mounted in a stationary housing (not shown).

It will be appreciated that under normal load conditions there will be no differential movement between the gears 86 and 87 which will rotate in unison with the carrier member 83 and so the shaft 77 and divider member 80 will each rotate in unison with one another and with the drive shaft 73. However, when the traction forces associated with the wheels on each of the axles vary, the power may be divided in a non-uniform manner, and the differential unit 76 will accommodate the resulting relative rotation between the shaft 77 and the power divider member 80.

The pinion input shaft 72 on the differential unit 70 of the forward axle is coupled to the power divider member 80 by a chain drive mechanism 75 so that the pinion input shaft 72 and the power divider member 80 will rotate in the same direction and both will rotate in the same direction as the shaft 77. The power divider member 80 and the pinion 72 each incorporate external cylindrical surfaces upon which a suitable tooth formation is provided to mesh with the chain 75 and provide a positive non-slip transmission of power between the power-divider member 80 and the pinion shaft of the front axle differential.

A locking sleeve 85 is slidably supported upon a spline section 95 of the shaft 73 and may be selectively locked to the power-divider member 80 so as to cancel the affect of the differential unit 76 when the vehicle is operating under adverse traction conditions. The locking sleeve is disengaged when the vehicle is operating under normal conditions. The movement of the locking member can be controlled by the driver through a suitable actuating mechanism which may be hydraulic or pneumatically controlled.

It will be appreciated from the above description with respect to FIG. 4 of the drawings that the invention also provides a transmission for delivering power to two tandemly arranged axles each having a wheel at either end and a differential unit coupled to the respective axles, the transmission including a main shaft adapted for coupling to an input shaft of one axle differential unit, a power divider member mounted axially with the main shaft for rotation relative thereto, a divider differential unit coupling the main shaft and the divider member and including a planatory gear carrier member co-axial with the main shaft and adapted to be drive coupled to a power input shaft so the carrier member divider member and main shaft all rotate in the same direction in use.

Reference will now briefly be made to FIGS. 5a, 5b and 6 which illustrate the arrangement of leaf springs in a tandem wheel drive configuration and a load transfer linkage 41 forming part of the spring mounting. As is best seen in FIGS. 5a and 5b, the leaf springs 37, 45 overlap each other in the longitudinal direction while the forward or mid spring 37 is arranged laterally outwardly of the rear or aft spring 45. The forward end of spring 37 is pivotally mounted to the side rail 21 of the chassis at a fixed point 39. Similarly the forward end of spring 45 is pivotally mounted at a fixed location 120 to the side rail 21. The rear ends of the springs 37, 45 are pivotally interconnected by the load transfer linkage 41.

The load transfer linkage comprises a bracket 121 fixed to the chassis side rail 21. A first bell crank 122 is pivoted at a forward end of the bracket 121 at 123 and a second bell crank 124 is similarly pivoted at 125 to the bracket 121. A rigid link 126 pivotally interconnects respective arms of the bell cranks 122 and 124. The other arms of the bell cranks have downwardly depending shackles 127, 128 which are both pivoted to the arms of the bell cranks and the rear ends of the springs 37, 45. As can be seen in FIGS. 5b and 6, the second bell crank 124 has its pivot region extended whereby the arms thereof are effectively offset to accommodate the offset displacement of the springs.

I claim:

1. A vehicle suspension assembly comprising:
   a chassis,
   said chassis having a longitudinal chassis axis and defining a longitudinal chassis direction
   an axle assembly disposed transversely to said longitudinal chassis direction,
   a pair of wheels rotatably supported on said axle assembly,
   a pair of laterally-spaced suspension leaf springs each connected at each end thereof to said chassis and disposed generally parallel to said longitudinal chassis direction,
   a first connector means for connecting said axle assembly to each said suspension leaf spring intermediate the ends of said leaf springs and permitting pivotal movement between said axle assembly and each said suspension leaf spring about respective axes parallel to said longitudinal chassis direction,
   a stabilizer member interconnected between said axle assembly and said chassis,
   a second connector means for connecting said stabilizer member to said axle assembly and to said chassis at longitudinally-spaced locations and permitting pivotal movement relative to each about respective transverse axes parallel to said axle assembly,
   said second connector means permitting pivotal movement between said stabilizer member and at least one said axle assembly and said chassis about an axis parallel to said longitudinal chassis axis, and
   said second connector means permitting linear movement between said stabilizer member and at least one axle assembly and said chassis in said longitudinal chassis direction.

2. The vehicle suspension assembly according to claim 1 wherein said second connector means permits linear movement between said stabilizer member and said axle assembly and said chassis in said longitudinal chassis direction.

3. The vehicle suspension assembly according to claim 1 wherein said second connector means permits pivotal movement between said stabilizer member and said axle assembly and said chassis about said parallel axis.

4. The vehicle suspension assembly according to claim 1 wherein said stabilizer member is positioned and adapted to prevent linear movement between said stabilizer member and at least one said axle assembly and said chassis beyond a predetermined limit.

5. The vehicle suspension assembly according to claim 1 wherein said stabilizer member is positioned and adapted to prevent linear movement between said stabilizer member and said axle assembly and said chassis beyond a predetermined limit.

6. The vehicle suspension assembly according to claim 1 wherein said axle assembly includes bearing extensions extending longitudinally from either side of said axle assembly, said first connector means comprises a channel-shaped member including two downwardly-depending flanges, a web, pivot shafts, and rotational and thrust bearings, said web connecting said flanges, said web being adapted for connection to a respective said suspension leaf spring such that an end said axle assembly is receivable between said two downwardly-depending flanges, said pivot shafts extending inwardly from aid flanges and being receivable within said bearing extensions, and said rotational and thrust bearings being at both forward and rear ends of said channel-shaped member.

7. The vehicle suspension assembly according to claim 1 wherein each said suspension leaf spring has one end and another end, said one end being pivotally connected for movement about a fixed pivot axis relative to said chassis, and said another end being connected for limited displacement in said longitudinal chassis direction as said suspension leaf spring deflects under load.

8. The vehicle suspension assembly according to claim 1 wherein both ends of each of said suspension springs are mounted for limited displacement in said longitudinal chassis direction as said suspension leaf spring deflects under load.

9. The vehicle suspension assembly according to claim 8 further comprising control arms connected between said axle assembly and said chassis such that up and down movement of said axle assembly is on a controlled arcuate path.

10. The vehicle suspension assembly according to claim 1 including said axle assembly defining an aft axle assembly, a fore axle assembly disposed transversely to said longitudinal chassis direction, a pair of wheels supported on said fore axle assembly, a pair of laterally-spaced suspension leaf springs connecting said fore axle assembly to said chassis, each said spring being disposed generally parallel to said longitudinal chassis direction, and said springs connecting said fore axle assembly to said chassis being laterally spaced apart by a distance different than the lateral spacing of said springs connecting said aft axle assembly to said chassis.

11. The vehicle suspension assembly according to claim 10 wherein the lateral spacing between said spring connecting said fore axle assembly to said chassis is greater than the lateral spacing between said springs connecting said aft axle assembly to said chassis.

12. The vehicle suspension assembly according to claim 11 wherein adjacent ends of said springs connecting said fore and aft axle assemblies to said chassis overlap one another in the longitudinal direction.

13. The vehicle suspension assembly according to claim 12 further comprising a steerable axle assembly positioned forward of said fore and aft rear axle assemblies, and suspension leaf springs carrying said steerable axle assembly having a transverse spacing less than the distance between the springs of said fore and aft axle assemblies.

* * * * *